US011669381B1

(12) United States Patent
Foxworth et al.

(10) Patent No.: US 11,669,381 B1
(45) Date of Patent: Jun. 6, 2023

(54) REAL-TIME ERROR DEBUGGING

(71) Applicant: International Business Machines Corporation, Armonk, NY (US)

(72) Inventors: Briana E. Foxworth, Round Rock, TX (US); Anuwat Saetow, Austin, TX (US); Irving Guwor Baysah, Pflugerville, TX (US); Marc A. Gollub, Travis, TX (US); Edgar R. Cordero, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/454,987

(22) Filed: Nov. 15, 2021

(51) Int. Cl.
*G06F 11/00* (2006.01)
*G06F 11/07* (2006.01)
*G06F 11/36* (2006.01)

(52) U.S. Cl.
CPC ........ *G06F 11/0772* (2013.01); *G06F 11/079* (2013.01); *G06F 11/0787* (2013.01); *G06F 11/0793* (2013.01); *G06F 11/3664* (2013.01)

(58) Field of Classification Search
None
See application file for complete search history.

(56) References Cited

U.S. PATENT DOCUMENTS

| 7,386,765 | B2 | 6/2008 | Ellis |
| 7,496,823 | B2 | 2/2009 | Wheeler |
| 8,930,776 | B2 | 1/2015 | Cordero |
| 8,972,954 | B2 | 3/2015 | Brown |
| 9,063,902 | B2 | 6/2015 | Cordero |
| 9,753,806 | B1 | 9/2017 | Glancy |
| 9,904,266 | B2 | 2/2018 | Burr |
| 10,037,259 | B2 | 7/2018 | Adeeb |
| 10,379,158 | B2 | 8/2019 | Champoux |
| 10,509,713 | B2 | 12/2019 | Svensson |
| 10,579,504 | B2 | 3/2020 | Tucker |
| 10,908,987 | B1 | 2/2021 | Pandey |

(Continued)

FOREIGN PATENT DOCUMENTS

| CN | 101739336 A | 6/2010 |
| CN | 109086156 A | 12/2018 |
| CN | 113114480 A | 7/2021 |

OTHER PUBLICATIONS

Google Patents/Scholar search—text refined (Year: 2022).*
Mainline program—IBM Documentation, z/OS Communication Server: SNA Programming, IBM Corp. 1990, 2014 (Year: 2014).*

(Continued)

*Primary Examiner* — Christopher S McCarthy
(74) *Attorney, Agent, or Firm* — Joseph P. Curcuru (57) ABSTRACT

In an approach to improve resolving defects within computer hardware, programs, software, or systems, embodiments pause mainline traffic and isolating interface or retention issues, and determine one or more types of errors in an event of a mainline traffic fail, wherein debug techniques are applied to fail information to resolve or further diagnose the one or more types of errors, and wherein the debug techniques are tracked and categorized. Additionally, embodiments apply corrective read actions to a detected error based on previously stored corrective actions associated with the detected error, and responsive to identifying no additional actions are required, restoring a collected system data. Further, embodiments, resume the paused mainline traffic.

20 Claims, 4 Drawing Sheets

(56) References Cited

U.S. PATENT DOCUMENTS

| | | |
|---|---|---|
| 2008/0133977 A1 | 6/2008 | Chun |
| 2010/0122072 A1 | 5/2010 | Yarimizu |
| 2014/0173539 A1 | 6/2014 | Zhang |
| 2014/0317473 A1* | 10/2014 | Cordero ................. G11C 29/42 |
| | | 714/773 |
| 2017/0039131 A1 | 2/2017 | Bates |
| 2017/0147471 A1 | 5/2017 | Shadi |
| 2019/0042391 A1 | 2/2019 | Menon |
| 2019/0229999 A1 | 7/2019 | Sarfaty |
| 2019/0303237 A1 | 10/2019 | Chauhan |
| 2019/0354453 A1 | 11/2019 | Hsu |
| 2019/0354464 A1* | 11/2019 | Peck ................... G06F 11/3664 |
| 2020/0117625 A1 | 4/2020 | Browne |
| 2020/0301819 A1* | 9/2020 | Kavilipati .............. G06N 3/063 |
| 2021/0216406 A1 | 7/2021 | Silverstein |

OTHER PUBLICATIONS

Google Scholar/Patents search—text refined (Year: 2023).*

Campbell et al., "Real-Time Trace: A Better Way To Debug Embedded Applications", SYNOPSYS Accelerating Innovation, White Paper, Nov. 2014, 9 pages.

Gulzar et al., "Debugging Big Data Analytics in Spark With BigDebug", SIGMOD'17, May 14-19, 2017, Chicago, IL, USA, 4 pages.

Han et al., "Enhancing Memory Error Detection for Large-Scale Applications and Fuzzy Testing", Network and Distributed Systems Security (NDSS) Symposium 2018, Feb. 18-21, 2018, San Diego, CA, USA, ISBN 1-1891562-49-5, 15 pages.

Novark et al., "Exterminator: Automatically Correcting Memory Errors With High Probability", PLDI'07 Jun. 11-13, 2007, San Diego, California, USA, Copyright © 2007 ACM, 11 pages.

International Search Report and Written Opinion for Application No. PCT/CN2022/129950, dated Jan. 20, 2023, 8 pages.

* cited by examiner

REAL-TIME ERROR DEBUGGING

BACKGROUND OF THE INVENTION

The present invention relates generally to the field of computer programming and software development, and more particularly to finding and resolving defects within computer hardware, programs, software, or systems.

In computers, debugging is the process of locating and fixing or bypassing bugs (errors) in computer program code or the engineering of a hardware device. Debugging a program or hardware device begins identifying a problem, isolating the source of the problem, and then fixing the identified problem. Debugging tactics may involve interactive debugging, control flow analysis, unit testing, integration testing, log file analysis, monitoring at the application or system level, memory dumps, and profiling. Many programming languages and software development tools also offer programs to aid in debugging, known as debuggers. Further, debugging is the process of detecting and removing of existing and potential errors (also called as 'bugs') in a software code that can cause it to behave unexpectedly or crash. To prevent incorrect operation of a software or system, debugging is used to find and resolve bugs or defects. When various subsystems or modules are tightly coupled, debugging becomes harder as any change in one module may cause more bugs to appear in another. Sometimes it takes more time to debug a program than to code it.

To debug a program, a user starts with a problem, isolate the source code of the problem, and then fix said problem. A user of a program must know how to fix the problem as knowledge about problem analysis is expected. When the bug is fixed, then the software is ready to use. Debugging tools (called debuggers) are used to identify coding errors at various development stages. They are used to reproduce the conditions in which error has occurred, then examine the program state at that time and locate the cause. Programmers can trace the program execution step-by-step by evaluating the value of variables and stop the execution wherever required to get the value of variables or reset the program variables. Some programming language packages provide a debugger for checking the code for errors while it is being written at run time.

SUMMARY

Embodiments of the present invention disclose a computer-implemented method, a computer program product, and a system for applying a debugging solution in real-time, the computer-implemented method comprising: pausing mainline traffic and isolating interface or retention issues; determining one or more types of errors in an event of a mainline traffic fail, wherein debug techniques are applied to fail information to resolve or further diagnose the one or more types of errors, and wherein the debug techniques are tracked and categorized; applying corrective read actions to a detected error based on previously stored corrective actions associated with the detected error; responsive to identifying no additional actions are required, restoring a collected system data; and resuming the paused mainline traffic.

DETAILED DESCRIPTION

Embodiments of the present invention recognize that there is currently no effective way to freeze the state of a machine when it encounters an error during runtime. However, the possibility to freeze the state of a machine when it encounters an error during runtime exists for additional reads, writes, or settings to change before a halt is enacted. Further, embodiments of the present invention recognize that current techniques and products in the art perform the functions stated above; however, they contain several limitations and do not focus or assist with mainline traffic. Additionally, embodiments of the present invention recognize that "on-the-fly" (i.e., live/real time) settings changes in the field aren't available to attempt correction of fails. Embodiments of the present invention recognize that the two main types of memory error are data retention/storage issues (e.g., cell errors or hardware issues), and interface issues (e.g., Memory Controller (MC) to buffer chip through open memory interface (OMI) and/or Differential Memory interface (DMI) interface, and/or physical layer (PHY) on buffer chip to dual in-line memory module (DIMM) through double data rate (DDR) interface) where an estimated 90% of overall fields fail.

Further, embodiments of the present invention recognize that data retention/storage issues are difficult to enact corrective action during mainline without invoking spares or mirroring which is costly. Further, embodiments of the present invention recognize that interface issues can be narrowed down into specific transactions and potential enhancements can be developed to identify and mitigate these issues. Interface issue(s) refers to the inability to send information from point A to point B through an interface (read, write, and/or any other functions associated with an interface as they are known and understood in the art). Retention issue(s) refers to the inability to store and/or retrieve data from a cell. Embodiments of the present invention improve the art and solve the issues stated above by executing a real-time debugging solution by pausing traffic and isolating (Interface and/or Retention Issues) and determining one or more types of errors in the event of a mainline traffic fail, wherein debug techniques are applied to fail information to resolve or further diagnose the one or more types of errors, and wherein the debug techniques are tracked and categorized.

Implementation of embodiments of the invention may take a variety of forms, and exemplary implementation details are discussed subsequently with reference to the Figures (i.e., FIG. 1A-FIG. 3).

Figure 1A:
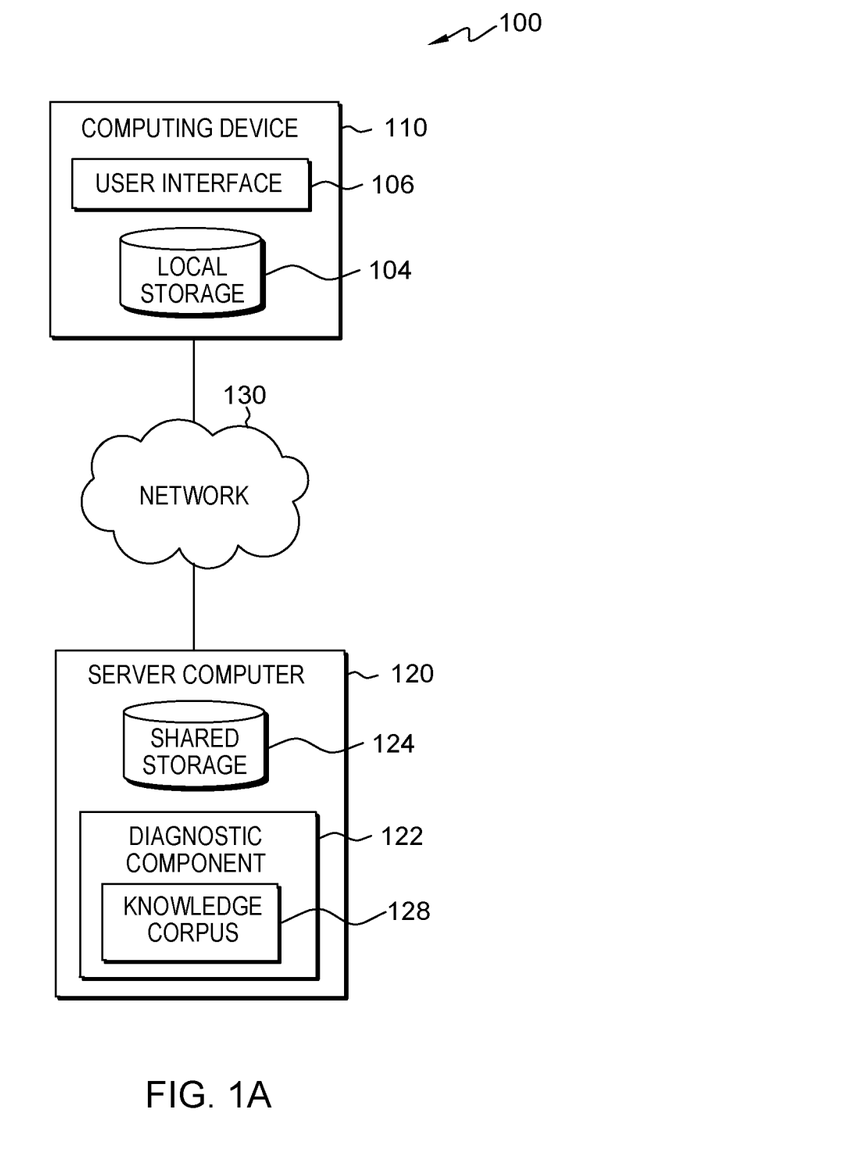
FIG. 1A is a functional block diagram illustrating a distributed data processing environment, in accordance with an embodiment of the present invention.

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to diagnostic component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 3. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 3. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG. 1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130. In the depicted embodiment, component 122 comprises knowledge corpus 128. In some embodiments, knowledge corpus 128 may be shared storage 124. Component 122 may be or act as a processor runtime diagnostic.

In various embodiments of the present invention, not depicted in FIG. 1A, and knowledge corpus 128 may each execute on a plurality of server computers 120 and/or on a plurality of computing devices 110. In some embodiments, and knowledge corpus 128 may each be located and/or executed anywhere within distributed data processing environment 100 as long as knowledge corpus 128 are connected to and/or communicates with, computing device 110, component 122, and/or server computer 120, via network 130. In various embodiments, component 122, via knowledge corpus 128, stores detected anomalies (i.e., errors/bugs) and the applied solutions for future reference and application to future detected anomalies, wherein component 122 compares future and/or current detected anomalies with historic to retrieve and apply solutions to the future and/or current detected anomalies.

In the event of a mainline traffic fail, component 122 can temporarily pause traffic while isolating interface and/or retention issues and determining the types of errors (e.g., read, write, and/or other types of errors known in the art). For example, error correcting code (ECC) checking, parity checking, read response (i.e., read failed), error condition detection logic, performing a retry of the read, and determining if the error remained (which would indicate a write failure or failed memory cell). Component 122 may correct detected errors using pre-packaged enhanced corrective action codes in real-time. In various embodiments, component 122 enables real-time mainline error debugging and setting adjustments. Component 122 may determine if the error was an interface and/or retention issue. If an interface issue is identified then component 122 may fix a correctable error (CE) for a read or write. In some embodiments, only the read may be fixed for an uncorrectable Error (UE). A user (e.g., system owner) may determine the amount of time spent on each type of error based upon the severity of the error and report, via interface 106, the determined time spent on each type of error to component 122, wherein time spent is the time spent diagnosing and addressing different types of errors, (i.e., a correctable error farther up in the data path may not be worth fixing as opposed to one or more uncorrectable errors that could cause issues in other parts of the system). For example, spending more time on one or more UE's since the system will go down (i.e., crash) if UE is not fixed and only spending enough time on the CE to complete another read to determine if it was a read issue since error correcting code (ECC) can fix it. In some embodiments, the amount of time spent on each type of error is predetermined or prioritized by component 122 using a predetermined weight to prioritize the amount of time spent on each type of error. In various embodiments, component 122 receives user feedback to improve the functionality of debugging components. Component 122 may generate and output, via interface 106, responsive prompt to the user, wherein the responsive prompts prompt the user to decides if processor runtime diagnostics "PRD" is involved, to confirm or deny whether an issue is persisting or solved, and/or responsive to confirming the issue is solved to store the error/issue and solution to local storage 104 and/or shared storage 124, wherein PRD can identify if there are other errors or if the identified error(s) were "fixed" in a previous debugging scenario.

In various embodiments, component 122 improves the art and solve the issues stated above by executing a real-time debugging solution by pausing traffic and isolating (Interface and/or Retention Issues) and determining one or more types of errors in the event of a mainline traffic fail, wherein debug techniques are applied to fail information to resolve or further diagnose the one or more types of errors, and wherein the debug techniques are tracked and categorized. In various embodiments, component 122 detects and triages one or more errors. Based on the detected and triaged one or more errors, component 122 may pause mainline traffic, wherein the pausing of mainline traffic is determined during triage. Further, in some embodiments, error severity and user options may determine if a pause isn't necessary. Severity may be determined by consuming and analyzing the data of various parts of a system. Examples comprise, but are not limited to, system crashes, data integrity, reduced bandwidth, and/or proximity to the limits of the capabilities of the ECC to correct (i.e., using all of the correctable symbols) In various embodiments, component 122 accesses (e.g., retrieves and/or receives, collects, and analyzes) the snapshot queue, data, and settings of computing device 110 and/or code executed on computing device 110 and/or server computer 120, wherein examples of collected and analyzed settings comprise, but are not limited to, calibration results on the interface, read retries, distribution of correctable errors).

Component 122 may identify the read fail location based on the accessed snapshot queue, data, and settings and/or by executing a read function or command to output a pass or fail. In various embodiments, if "pass" is output then there is in intermittent issue or read issue but if "fail" is output then there is a write issue or cell issue. Responsive to either passing or failing the executed read command/function component 122 executes corrective read actions, wherein corrective actions can require mainline traffic to pause here if the mainline traffic is not already paused. Examples of corrective actions for reads or writes comprise, but are not limited to: initiating a number of read loops of failing address, writing known data to failing address and read, implementing signal integrity fail recovery and mainline calibration for DRAM, and/or adjusting timings (e.g., implementing DRAM command timing adjustments to alleviate DRAM failures). Examples of corrective actions for reads comprise, but are not limited to: adjusting read phase rotators, adjusting windage, reading capture timings, writing capture timings, changing Read Latency Offset (RLO), correcting Actions for Writes, adjusting write phase rotators, and changing Write Latency Offset (WLO).

In various embodiments, component 122 executes processor runtime diagnostics (PRD) to identify any additional actions. Examples of PRD comprise, but are not limited to:

keeping track of the number, type, and location of the identified/detected fails, wherein keeping track of the number, type, and location of the identified/detected fails enables the option to perform additional corrective actions to the diagnose repeating/similar fails, evaluating if adjustments from corrective actions should be kept or reverted to original state, and/or determining the need for additional corrective actions. Example of user options comprise, but are not limited to: setting/establishing an error priority, wherein setting an error priority comprises deciding to pause or not pause correctable errors and enable longer analysis on the uncorrectable errors, presetting which corrective actions to take (e.g., only allow certain corrective actions to occur), and/or determining the detail of one or more log outputs for different scenarios (e.g., detailing uncorrectable errors versus correctable errors and/or producing in-depth logs during a debugging process), wherein uncorrectable errors comprise, but are not limited to, errors not correctable with ECC, parity errors, cyclical redundancy checks (CRC) errors.

In various embodiments, component 122 restores the queue, data, and settings and resumes mainline traffic, wherein restoring the queue, data, and settings comprises collecting the context for the bus that is stopped (e.g., reads and writes in flight), arbitration queues, and/or other context related to a bus as they are known and understood in the art. The collected items are restored in their pre-stop states and the bus and traffic would then be restarted. In various embodiments, component 122 may generate and display responsive prompts, via interface 106, to a user, wherein the responsive prompts query the user to confirm the implementation of the corrective action and/or to confirm the continuation of mainline traffic, wherein responsive to receiving confirmation from the user, component 122 resumes the mainline traffic. For example, a correctable error is detected to be reoccurring, via component 122, wherein component 122 identifies that an analysis would be triggered and triggers an analysis of the identified correctable error. Upon analysis of the error and the timings associated with the bus associated with the identified error, component 122 identifies the likely cause for the issue is an incorrectly delayed data path based on the analysis. In this example, component 122 adjusts the path according to prior knowledge and resumes the traffic in order to allow the computer system to continue to use the interface.

Figure 1B:
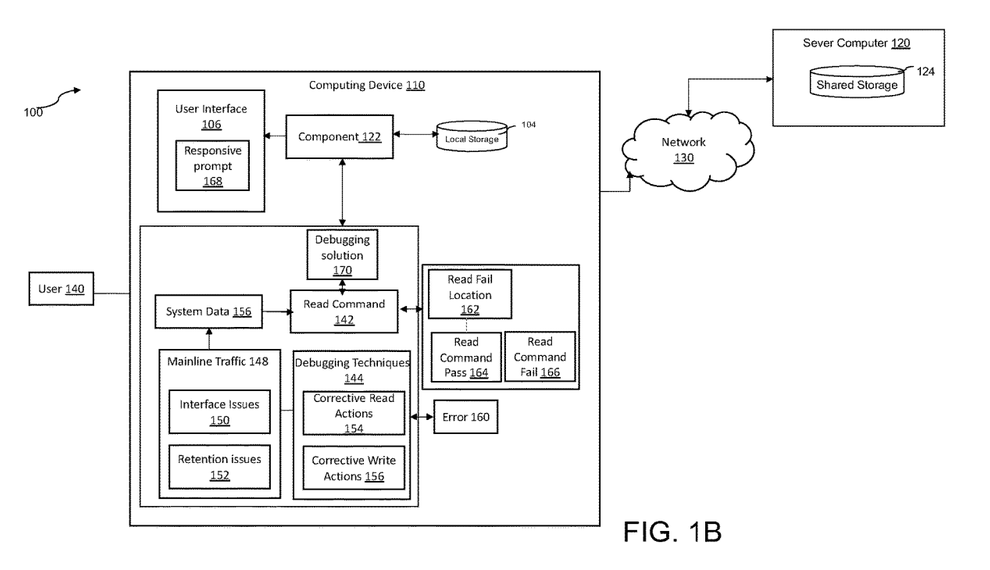
FIG. 1B is a functional block diagram illustrating a distributed data processing environment of a diagnostic component, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, user 140, and server computer 120 interconnected over network 130.

In various embodiments, component 122 executes a real-time debugging solution for a computer system. Component 122 may pause mainline traffic 148 and isolate interface issues 150 on interface 106 and/or retention issues 152 on computing device 110 (e.g., a computer system). Component 122 may collect system data 156 and determine one or more types of errors 160 in an event of a mainline traffic fail, wherein debugging techniques are applied to the failed information to resolve or further diagnose the one or more types of errors 160, and wherein the debug techniques are tracked and categorized. In the depicted embodiment, component 122 applies corrective read actions 154 to detected error 160 based on previously stored corrective actions associated with the identified issue (e.g., error 160). In various embodiments, responsive to identifying no additional actions (e.g., debugging techniques 144) are required, component 122 restores collected system data 156 to the levels and/or status system data was when it was originally collect by component 122. In other embodiments, system data 156 is returned to predetermined levels and/or status. In various embodiments, subsequent to the application of a solution to error 160, component 122 may resume the paused mainline traffic.

Component 122 may detect error 160 in computing device 110 (e.g. a computer system) wherein error 160 may be a software issue, a hardware issue, or a combination of both the software issue and the hardware issue in the computer system. In various embodiments, responsive to determining read fail location 162 based on an execution of read command 142 (i.e., read function) outputting read command pass 164 (i.e., passing), component 122 identifies error 160 as an intermittent issue or a read issue. In various embodiments, responsive to read command 142 outputting read command fail 166, component 122 identifies the one or more errors as write or cell issues by performing multiple reads or writes and checking the states of data in the computer system (e.g., system data 156). In various embodiments, component 122 identifies and/or retrieves debugging solution 170 from local storage 104 and/or shared storage 124 based on the identified error 160 and/or the identified read fail location 162. Component 122 may implement debugging solution 170 to resolve error 160. Component 122 may display, by interface 106, responsive prompt 168 to user 140, via interface 106, wherein responsive prompt 168 query's user 140 to confirm the application of a corrective action (e.g., execution of debugging solution 170) or to confirm the resuming of mainline traffic 148.

Component 122 may output, by interface 106, responsive prompt 168 to user 140 that query's the user to accept and rate the implemented solution (i.e., debugging solution 170), and stores a response from the user to a storage component (e.g., local storage 104 or shared storage 124) for future use (e.g., implementation) or reference. In various embodiments, component 122 may output, by interface 106, responsive prompt 168 to user 140, wherein responsive prompt 168 query's the user to confirm if processor runtime diagnostics is involved and to select whether the issue (e.g., error 160) is persisting or if the issue (e.g., error 160) was solved by the implementation of debugging solution 170. Responsive to confirming the issue (e.g., error 160) is solved, component 122 may store error 160 and debugging solution 170 to a database (e.g., local storage 104 or shared storage 124), wherein the component 122 retrieves previous debugging scenarios and solutions similar to the detected error.

Figure 2:
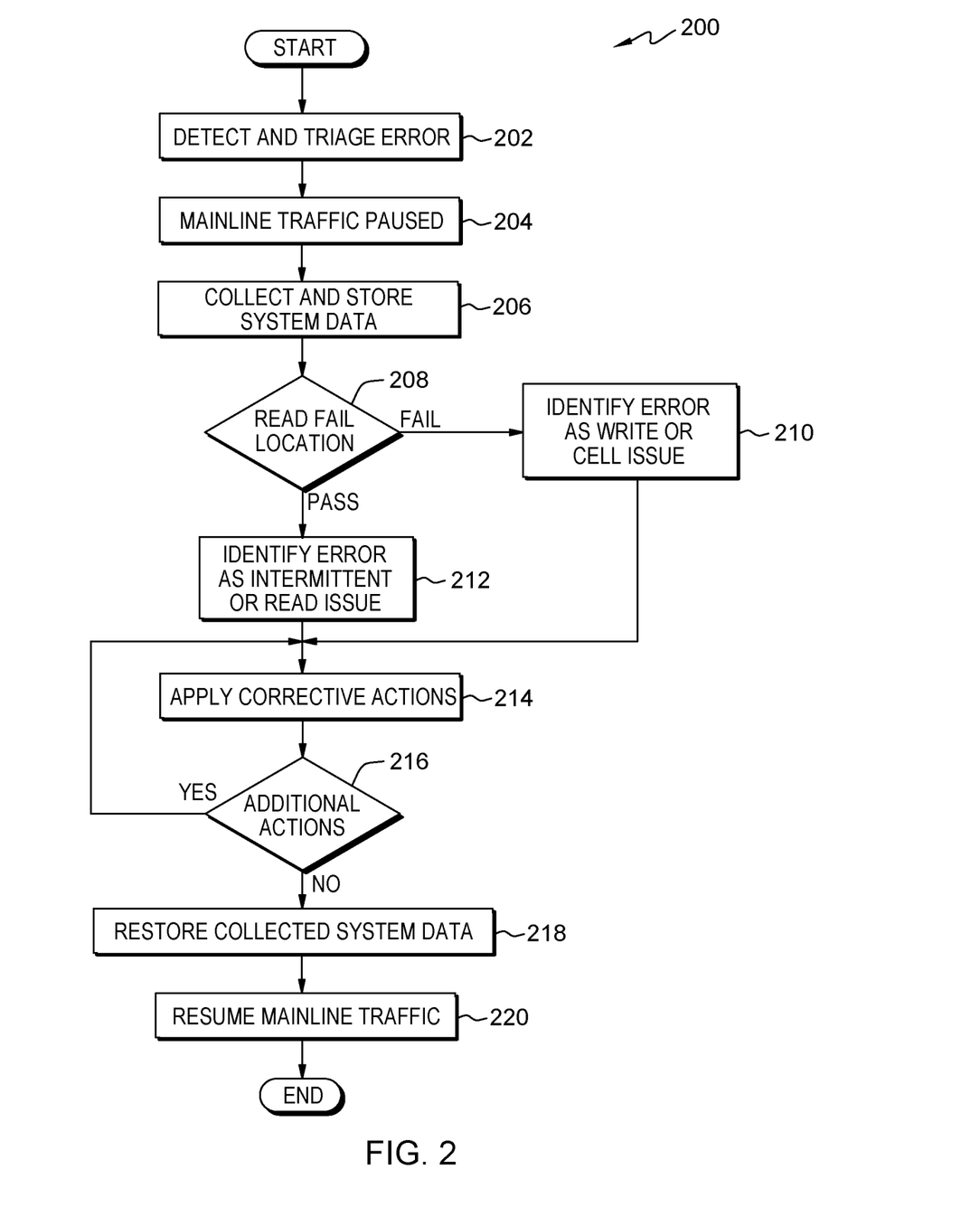
FIG. 2 illustrates operational steps of a diagnostic component, on a server computer within the distributed data processing environment of FIG. 1A, for applying a debugging solution in real-time, in accordance with an embodiment of the present invention.

FIG. 2 illustrates operational steps of component 122, generally designated 200, in communication with server computer 120, within distributed data processing environment 100 of FIG. 1A and/or FIG. 1B, for applying a debugging solution in real-time, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 detects and triages an error. In various embodiments, component 122 detects and triages one or more errors in one or more codes.

In step 204, component 122 pauses mainline traffic. In various embodiments, component 122 may pause the mainline traffic. Mainline traffic may be paused for a predetermined amount of time or until component 122 resumes the mainline traffic.

In step 206, component 122 collects and stores the snapshot queue, data, and settings. In various embodiments, component 122 collects and stores system data, wherein system data comprises the snapshot queue, data, and settings of a computer system.

In step 208, component 122 determines the read fail location. In various embodiments, component 122 determines the location of one or more read fail locations by executing a read command (e.g., read function). In the depicted embodiment, if the executed function outputs a "Fail", Fail step, then there is a write issue or cell issue and component 122 advances to step 210; however, if the function outputs a "Pass", pass step, then there is in intermittent issue or read issue and component 122 will advance to step 212.

In step 210, component 122 identifies the error as a write or cell issue. In various embodiments, responsive to the output of the read function failing, component 122 identifies the one or more errors as write or cell issues. Component 122 may identify an error as a write or cell issue by performing multiple reads or writes and checking the states of the data. Performing a second read to a failing address and receiving the correct data indicates that the error was introduced or was a result of the first read and also indicates that the failure was not on the write or the result of a faulty memory cell.

In step 212, component 122 identifies the error as an intermittent or read issue. In various embodiments, responsive to the output of the read function passing, component 122 identifies the one or more errors as intermittent or read issues.

In step 214, component 122 applies corrective actions. In various embodiments component 122 applies corrective actions to the identified errors to repair the computer program, software, or system, wherein if the error is identified as an intermittent or read issue then corrective read actions are applied/executed but if the error is identified as a write or cell issue then corrective write actions are applied/executed.

In step 216, component 122 determines if any additional actions should to be applied. Additional actions may be taken if the errors persist or if the corrective action is multipart (e.g., adjusting the delay setting for data and then adjusting a latency timer to account for the first change). In various embodiments, component 122 determines, through PRD, if any additional actions should be applied to the code (e.g., computer programs, software, or systems). In the depicted embodiment, if component 122 identifies any additional actions then component 122 repeats step 214 but if component 122 identifies no additional actions then component 122 advance to step 218.

In step 218, component 122 restores the collected system data. In various embodiments, component 122 restores the collected system data (e.g., queue, data, and settings) to the state at which it was collected.

In step 220, component 122 resumes the mainline traffic. In various embodiments, component 122 resumes the paused mainline traffic. In various embodiments, component 122 may generate and display responsive prompts, via interface 106, to a user, wherein the responsive prompts query the user to confirm the implementation of the corrective action and/or to confirm the continuation of mainline traffic, wherein responsive to receiving confirmation from the user, component 122 resumes the mainline traffic. In various embodiments, component 122 generates and outputs one or more responsive prompts, via interface 106, that query the user to accept and/or rate the implemented solution or prompts the user to select whether component 122 should resume mainline traffic. Component 122 may store the received user responses to knowledge corpus 128, shared storage 124, and/or local storage 104 for future use and/or reference.

Figure 3:
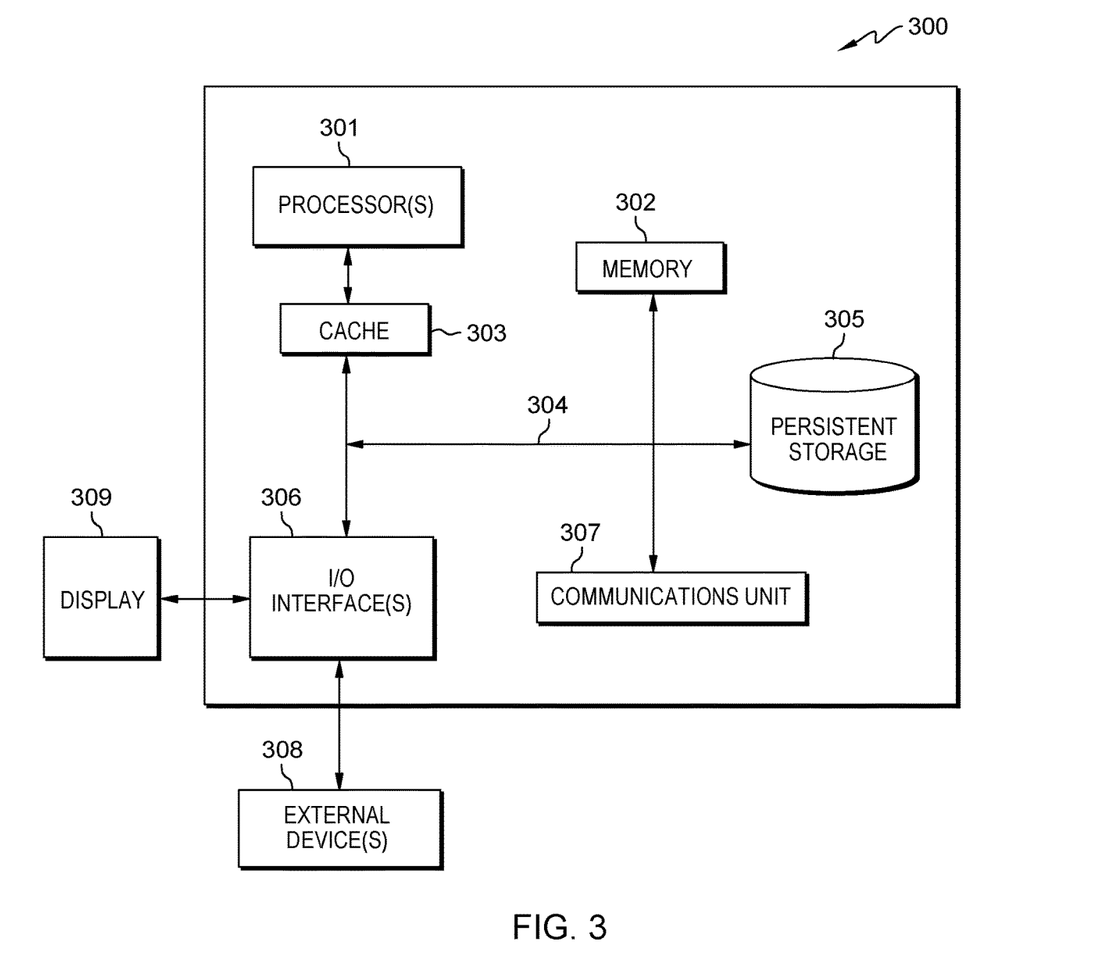
FIG. 3 depicts a block diagram of components of the server computer executing the diagnostic component for error detecting within the distributed data processing environment of FIG. 1A, in accordance with an embodiment of the present invention.

FIG. 3 depicts a block diagram of components of server computer 120 within distributed data processing environment 100 of FIG. 1A and/or FIG. 1B, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 depicts computer system 300, where server computing 120 represents an example of computer system 300 that includes component 122. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 may be implemented with any architecture designed for passing data and/or control information between processors (such as microprocessors, communications, and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 enables for input and output of data with other devices that may be connected to each computer system. For example, I/O interface 306 may provide a connection to external devices 308 such as a keyboard, keypad, a touch screen, and/or some other suitable input device. External devices 308 may also include portable computer readable storage media such as, for example, thumb drives, portable optical or magnetic disks, and memory cards. Software and data used to practice embodiments of the present invention may be stored on such portable computer readable storage media and may be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for a real-time debugging solution in a computer system, the computer-implemented method comprising:
   pausing mainline traffic and isolating interface or retention issues for a predetermined amount of time;
   determining one or more types of errors in an event of the mainline traffic failing, wherein debug techniques are applied to fail information to resolve or further diagnose the one or more types of errors, and wherein the debug techniques are tracked and categorized;
   applying corrective read actions to a detected error based on previously stored corrective actions associated with the detected error;
   responsive to identifying no additional actions are required, restoring a collected system data; and
   resuming the paused mainline traffic.

2. The computer-implemented method of claim 1, further comprising:
   detecting an error in a computer system, wherein the error in the computer system is a software issue, a hardware issue, or a combination of both the software issue and the hardware issue.

3. The computer-implemented method of claim 1, further comprising:
   responsive to determining a read fail location based on an executed read function outputting passing, identifying the error as an intermittent issue or a read issue.

4. The computer-implemented method of claim 1, further comprising:
   responsive to an output of a read function failing, identifying the one or more errors as write or cell issues by performing multiple reads or writes and checking states of data in the computer system.

5. The computer-implemented method of claim 1, further comprising:
   displaying, by an interface, a responsive prompt to a user, wherein the responsive prompt query's the user to confirm an application of a corrective action or to confirm the resuming of the mainline traffic.

6. The computer-implemented method of claim 1, further comprising:
   outputting, by an interface, a responsive prompt to a user that query's the user to accept and rate the implemented solution; and
   storing a response from the user to a database for future use or reference.

7. The computer-implemented method of claim 1, further comprising:
   outputting, by an interface, responsive prompt to a user, wherein the responsive prompt query's the user to confirm if processor runtime diagnostics is involved and select whether the issue is persisting or if the issue is solved; and
   responsive to confirming the issue is solved, storing the error and solution to a database, wherein the processor runtime diagnostic retrieves previous debugging scenarios and solutions similar to the detected error.

8. A computer system for a real-time debugging solution, the computer system comprising:
   one or more computer processors;
   one or more computer readable storage devices;
   program instructions stored on the one or more computer readable storage devices for execution by at least one of the one or more computer processors, the stored program instructions comprising:
      program instructions to pause mainline traffic and isolating interface or retention issues for a predetermined amount of time;
      program instructions to determine one or more types of errors in an event of the mainline traffic failing, wherein debug techniques are applied to fail information to resolve or further diagnose the one or more types of errors, and wherein the debug techniques are tracked and categorized;
      program instructions to apply corrective read actions to a detected error based on previously stored corrective actions associated with the detected error;
      responsive to identifying no additional actions are required, program instructions to restore a collected system data; and
      program instructions to resume the paused mainline traffic.

9. The computer system of claim 8, further comprising:
   program instructions to detect an error in a computer system, wherein the error in the computer system is a software issue, a hardware issue, or a combination of both the software issue and the hardware issue.

10. The computer system of claim 8, further comprising:
responsive to determining a read fail location based on an executed read function outputting passing, program instructions to identify the error as an intermittent issue or a read issue.

11. The computer system of claim 8, further comprising:
responsive to an output of a read function failing, program instructions to identify the one or more errors as write or cell issues by performing multiple reads or writes and checking states of data in the computer system.

12. The computer system of claim 8, further comprising:
program instructions to display, by an interface, a responsive prompt to a user, wherein the responsive prompt query's the user to confirm an application of a corrective action or to confirm the resuming of the mainline traffic.

13. The computer system of claim 8, further comprising:
program instructions to output, by an interface, a responsive prompt to a user that query's the user to accept and rate the implemented solution; and
program instructions to store a response from the user to a database for future use or reference.

14. The computer system of claim 8, further comprising:
program instructions to output, by an interface, responsive prompt to a user, wherein the responsive prompt query's the user to confirm if processor runtime diagnostics is involved and select whether the issue is persisting or if the issue is solved; and
responsive to confirming the issue is solved, program instructions to store the detected error and the corrective read actions to a database, wherein the processor runtime diagnostic retrieves previous debugging scenarios and solutions similar to the detected error.

15. A computer program product for a real-time debugging solution, the computer program product comprising:
one or more computer readable storage devices and program instructions stored on the one or more computer readable storage devices, the stored program instructions comprising:
program instructions to pause mainline traffic and isolating interface or retention issues for a predetermined amount of time;
program instructions to determine one or more types of errors in an event of the mainline traffic failing, wherein debug techniques are applied to fail information to resolve or further diagnose the one or more types of errors, and wherein the debug techniques are tracked and categorized;
program instructions to apply corrective read actions to a detected error based on previously stored corrective actions associated with the detected error;
responsive to identifying no additional actions are required, program instructions to restore a collected system data; and
program instructions to resume the paused mainline traffic.

16. The computer program product of claim 15, further comprising:
program instructions to detect an error in a computer system, wherein the error in the computer system is a software issue, a hardware issue, or a combination of both the software issue and the hardware issue.

17. The computer program product of claim 15, further comprising:
responsive to determining a read fail location based on an executed read function outputting passing, program instructions to identify the error as an intermittent issue or a read issue.

18. The computer program product of claim 15, further comprising:
responsive to an output of a read function failing, program instructions to identify the one or more errors as write or cell issues by performing multiple reads or writes and checking states of data in the computer system.

19. The computer program product of claim 15, further comprising:
program instructions to output, by an interface, a responsive prompt to a user that query's the user to accept and rate the implemented solution; and
program instructions to store a response from the user to a database for future use or reference.

20. The computer program product of claim 15, further comprising:
program instructions to output, by an interface, responsive prompt to a user, wherein the responsive prompt query's the user to confirm if processor runtime diagnostics is involved and select whether the issue is persisting or if the issue is solved; and
responsive to confirming the issue is solved, program instructions to store the detected error and the corrective read actions to a database, wherein the processor runtime diagnostic retrieves previous debugging scenarios and solutions similar to the detected error.

\* \* \* \* \*